Jan. 12, 1943. L. A. PARADISE ET AL 2,308,102
SNAPPING ROLL
Filed March 7, 1940 2 Sheets-Sheet 1

INVENTOR:
LOUIS A. PARADISE
NORMAN F. ANDREWS
BY
ATTORNEYS.

Jan. 12, 1943.    L. A. PARADISE ET AL    2,308,102
SNAPPING ROLL
Filed March 7, 1940    2 Sheets-Sheet 2

INVENTOR:
LOUIS A. PARADISE
NORMAN F. ANDREWS
BY
ATTORNEYS.

Patented Jan. 12, 1943

2,308,102

UNITED STATES PATENT OFFICE 2,308,102

SNAPPING ROLL

Louis A. Paradise and Norman F. Andrews, Moline, Ill., assignors to Deere & Company, Moline, Ill., a corporation of Illinois Application March 7, 1940, Serial No. 322,710

8 Claims. (Cl. 130—5)

The present invention relates to snapping rolls for corn harvesters and the like. The advent of hybrid corn has introduced some serious problems in the design of mechanical corn pickers, for hybrid corn shells so easily that many of the kernels are shelled off during the snapping operation because of the aggressive action of the conventional snapping rolls now in use. The principal object of the present invention, therefore, is related to the provision of novel and improved snapping rolls which are sufficiently aggressive to remove the ears of corn from the stalks but yet are not aggressive enough to shell the kernels of corn from the ears. In the accomplishment of this object it has been found after extensive experiments in the field that the solution of this problem lies in the use of one snapping roll which has a substantially smooth cylindrical rubber surface and the other cooperative snapping roll being provided with metal ridges or lugs raised on the surface of the roll. When two metal rolls with ridges or lugs are used in cooperation to pick hybrid corn of the types now most commonly grown, there is an extensive loss from shelling, but if two rubber snapping rolls are used in cooperation the action is not sufficiently aggressive and many of the smaller ears of corn are passed between the rolls and are left on the standing stalks.

These and other objects and advantages of the present invention will be made apparent by a consideration of the following description in which reference is made to the drawings appended hereto, in which Figure 1 is a plan view of a pair of cooperative snapping rolls embodying the principles of this invention;

Figures 1, 2:
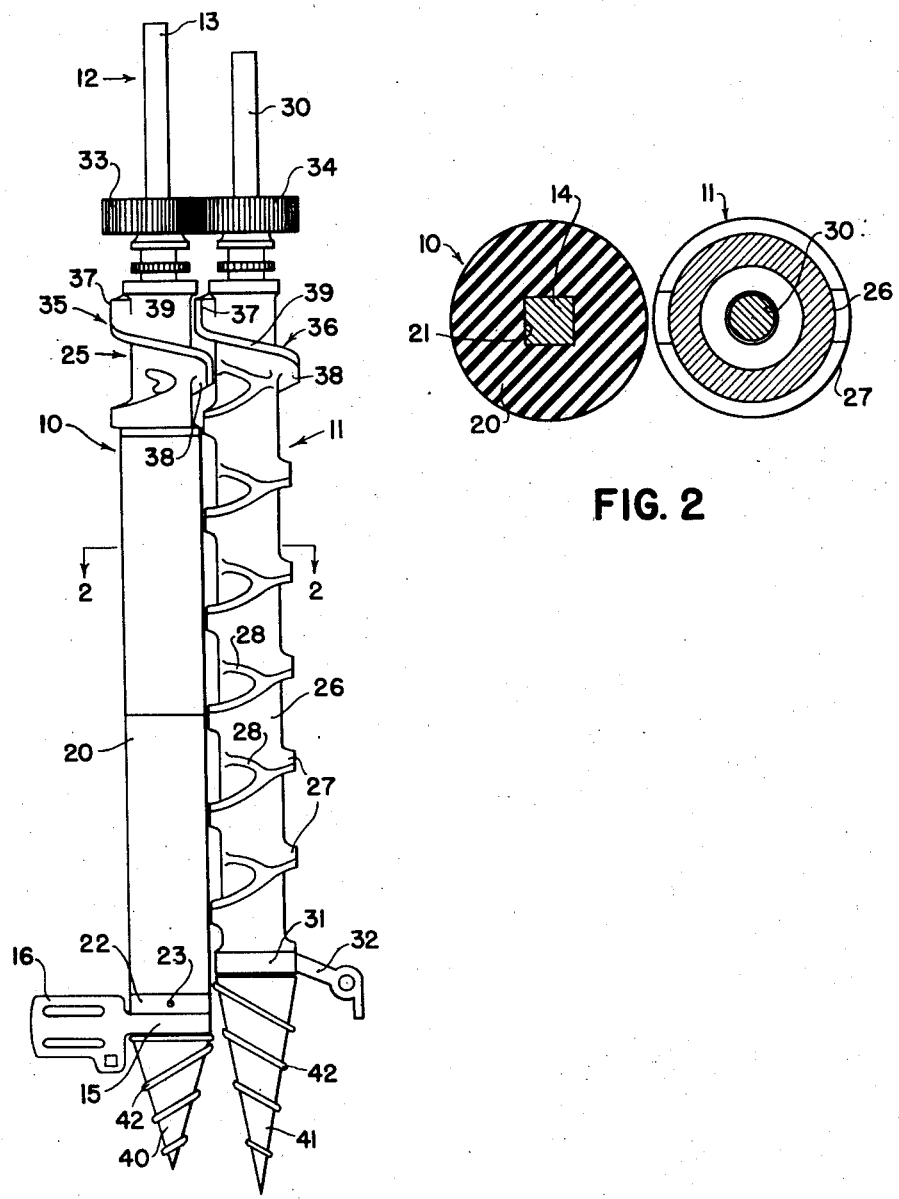
Figure 2 is a sectional view drawn to a larger scale, taken along a line 2—2 in Figure 1.

Referring now to the drawings and more particularly to Figures 1 and 2, reference numerals 10 and 11 indicate, respectively, a pair of cooperative snapping rolls arranged adjacent each other in parallel relation, in the position in which the rolls normally operate in a corn harvesting machine. Snapping roll 10 comprises a central supporting shaft 12, the upper end 13 of which is of circular cross section and is adapted to be supported in a journal bearing in the corn picker, for rotation about the major axis of the snapping roll. The intermediate portion 14 of the shaft 12 is of square cross section and the lower end of the shaft is supported in a journal bearing 15 carried on a suitable supporting bracket 16 in a manner well-known to those skilled in the art.

Mounted on the square portion of the shaft 12 is a rubber sleeve 20 which has a square opening 21 extending longitudinally centrally of the rubber sleeve 20 and adapted to receive the square portion 14 of the supporting shaft 12, and by means of which the rubber sleeve 20 is prevented from rotating relative to the shaft. The outer surface of the rubber sleeve 20 is substantially cylindrical and the texture of the rubber is firm but not hard. The rubber cylinder 20 is prevented from sliding downwardly by an annular metallic collar 22 which is fixed on the shaft 12 by a pin 23.

The upper end of the rubber cylinder 20 abuts against a cast metal sleeve 25 which is mounted rigidly on the shaft 12 and the purpose of which will be explained later.

The other snapping roll 11 is of more or less conventional construction and comprises a cast iron generally cylindrical body 26 having raised lugs or ridges 27 projecting outwardly from the surface of the roll and extending in a somewhat spiral arrangement along the roll with branches or forks 28 diverging therefrom at intervals.

The upper end of the roll 11 is supported on a bearing shaft 30 which is adapted to be suitably journaled in the corn harvester, and the lower end of the roll 11 is journaled in a bearing 31 carried on a bracket 32 which is also adapted to be supported on the frame of the corn picker. The two shafts 13, 30 are interconnected by means of a pair of intermeshing gears 33, 34, respectively, which maintain the two rolls 10, 11 in proper angular relation to each other and to maintain them in rotation at the same speed but in opposite directions. The rolls are driven by any suitable means (not shown) connected to the upper end of shaft 13 beyond the supporting bearing.

Frequently an ear of corn is encountered that is more firmly attached than the usual ear and so is not snapped from the stalk by the action of the rubber roll 20. To take care of these ears the upper ends of the snapping rolls 10, 11 are provided with more aggressive snapping means, in the form of metal ridges or lugs, which will now be described.

The metal sleeve 25 of the roll 10 is provided with raised lugs, indicated generally by reference numeral 35, which intermesh with corresponding raised lugs 36 on the other snapping roll 11. Each of the lugs 35, 36 comprises generally axially extending portions 37, 38 disposed on opposite sides of the roll but out of transverse alignment with each other, that is to say the lug 38 is opposite to the lug 37 but spaced along the roll axially therefrom and the portions 37, 38 are interconnected by a ridge 39 extending generally helically around the circumference of the roll. The two rolls 10, 11 are maintained in timed sequence by the gears 33, 34 so that the upper axially extending lug portion 37 of one roll is disposed in longitudinal alignment with the lower axially extending lug portion 38 of the other roll at the passing point of the two lugs during normal rotation, as indicated in Figure 1.

The lower ends of the snapping rolls 10, 11 are provided with conical points 40, 41, respectively, which have spiral ribs 42 fixed thereto and serve to gather the stalks between the rolls during operation in a manner well known to those skilled in the art.

In the embodiment shown in Figures 3 to 6, inclusive, the smooth rubber roll 10 is identical in construction with that shown in Figure 1, and therefore the various parts thereof are indicated by like reference numerals. The other roll 45, however, comprises a laminated assembly of generally cylindrical, alternately arranged sections 46, 47 composed of rubber and metal, respectively. Each of the sections 46, 47 is generally elliptical but are assembled on the shaft 30 with their abutting faces lying in planes disposed at an acute angle with the major axis of the shaft. Each of the sections 46, 47 is provided with a central square aperture 48 adapted to receive the shaft 30 to prevent relative rotation therebetween during operation.

Figure 5:
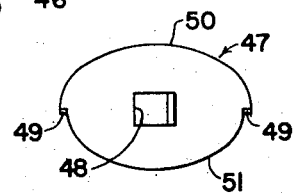
Figure 5 is a side elevation of one of the metal camming elements used in the embodiment of Figures 3 and 4.
Figure 3:
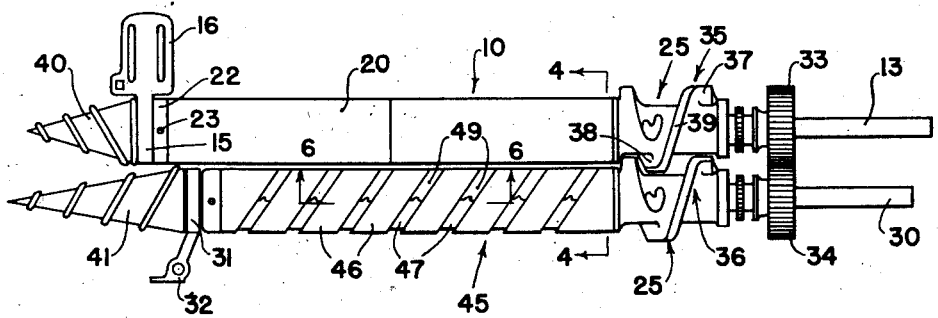
Figure 3 is a plan view of a pair of snapping rolls showing a modification of the present invention.
Figure 4:
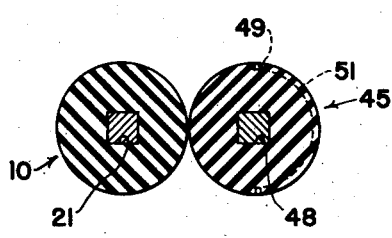
Figure 4 is a sectional view drawn to a larger scale, taken along a line 4—4 in Figure 3.

As indicated in Figure 5, each of the elliptical metal sections 47 has a pair of oppositely disposed stepped edges 49 provided by forming one-half 51 of the circumference of each of the metal sections 47 at a smaller radius from the axis of the roll than the opposite half 50 which is disposed on substantially the same radius of curvature as that of the rubber sections 46. These stepped edges 49 provide a gentle engagement with the corn stalks but which have very little tendency to shell the kernels from the ears.

In this embodiment each of the rolls 10, 45 is provided with a metallic sleeve 25 having intermeshing lugs or ridges 35, 36, respectively, as described in connection with Figure 1.

These two rolls 10, 45 are driven at the same speed of rotation but in opposite directions by any suitable means and are maintained in the proper relative angular position by intermeshing gears 33, 34.

Figure 7:
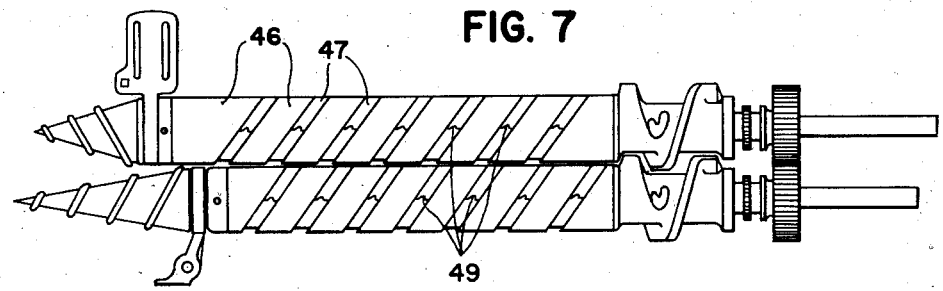
Figure 7 is a plan view of a pair of cooperative snapping rolls showing a second modification of the present invention.
Figure 6:
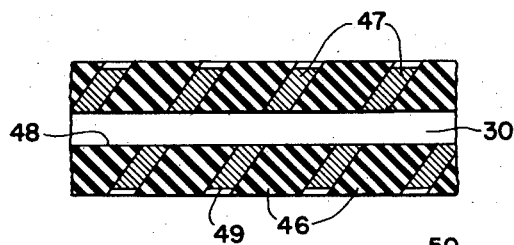
Figure 6 is a sectional view drawn to a larger scale, taken along a line 6—6 in Figure 3.

The embodiment shown in Figure 7 is similar to that shown in Figures 3 to 6, with the exception that the smooth cylindrical rubber sleeve 20 is replaced by the alternate metal and rubber sections 46, 47, with the result that a somewhat more aggressive action on the stalks is obtained and is adapted for such crop conditions as require more aggressive snapping action.

We do not intend our invention to be limited to the exact details shown and described herein except as limited by the claims which follow.

We claim:

1. A harvester roll comprising a laminated assembly of generally cylindrical, alternately arranged relatively flexible and inflexible sections, the abutting faces of said sections lying in planes disposed at an acute angle with the major axis of said roll.

2. A harvester roll comprising a laminated assembly of alternate elliptical sections of metal and rubber disposed at an acute angle to the major axis of the roll, the outer surfaces of said sections defining a generally cylindrical working surface.

3. A harvester roll comprising a laminated assembly of alternate elliptical sections of metal and rubber having faces disposed at an acute angle to the major axis of the roll, certain of said sections having adjacent portions of their circumferential surface offset at different radii to provide stepped stalk engaging edges, but the outer surfaces of said sections defining a generally cylindrical working surface.

4. A harvester roll comprising a laminated assembly of alternately arranged rubber and metal elliptical sections, the outer surfaces of which define a cylindrical working surface, and a tapered point at one end of said roll adapted to engage stalks and guide them to said working surface.

5. In a corn picker, a pair of cooperative rotary snapping rolls, one of said rolls being of flexible rubber over the major part of its length, the other roll having a central shaft and a plurality of alternate elliptical sections of rubber and metal supported on said shaft and disposed at an acute angle to the major axis of the roll, the outer surfaces of said alternate sections providing a generally cylindrical working surface.

6. A harvester roll comprising a laminated assembly of alternately arranged rubber and metal elliptical sections, the outer surfaces of said sections defining a generally cylindrical working surface.

7. In a corn picker, a pair of cooperative rotary snapping rolls, one of said rolls having a substantially smooth cylindrical flexible rubber surface over the major part of its length, the other roll having generally helical metallic ridges raised thereon, the upper end of said rubber roll having metal lugs positioned thereon to intermesh with the ridges on said other roll during rotation, said rolls having tapered points at one end adapted to cooperate to receive therebetween standing stalks during advance in the field.

8. In a corn picker, a pair of cooperative rotary snapping rolls disposed in parallel arrangement, one of said rolls having a substantially smooth cylindrical flexible rubber surface over the major part of its length, the other roll having generally helically arranged metallic ridges raised thereon, the upper ends of said rolls each having an upper and lower axially extending lug disposed on opposite sides thereof, respectively, and spaced axially out of transverse alignment with each other, and the lugs on the adjacent rolls being disposed in axial alignment at the passing point of said lugs.

LOUIS A. PARADISE.
NORMAN F. ANDREWS.